(12) United States Patent
Ho

(10) Patent No.: US 12,517,823 B2
(45) Date of Patent: Jan. 6, 2026

(54) FLASH MEMORY APPARATUS AND ERASE METHOD THEREOF

(71) Applicant: Winbond Electronics Corp., Taichung (TW)

(72) Inventor: Wen-Chiao Ho, Hsinchu County (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 18/915,304

(22) Filed: Oct. 14, 2024

(65) Prior Publication Data

US 2025/0130939 A1   Apr. 24, 2025

(30) Foreign Application Priority Data

Oct. 18, 2023 (TW) .................. 112139755

(51) Int. Cl.
*G06F 12/02* (2006.01)
(52) U.S. Cl.
CPC .. *G06F 12/0246* (2013.01); *G06F 2212/7205* (2013.01)
(58) Field of Classification Search
None
See application file for complete search history.

(56) References Cited

U.S. PATENT DOCUMENTS

| | | |
|---|---|---|
| 6,091,642 A | 7/2000 | Pasotti et al. |
| 6,442,074 B1 | 8/2002 | Hamilton et al. |
| 9,164,836 B2 | 10/2015 | Guo et al. |

FOREIGN PATENT DOCUMENTS

CN           103426473           7/2016

*Primary Examiner* — Kevin Verbrugge
(74) *Attorney, Agent, or Firm* — JCIPRNET

(57) ABSTRACT

A flash memory apparatus and an ERASE method thereof are provided. The ERASE method includes: applying an ERASE voltage to a target memory block and determining whether an ERASE verification passes during an ERASE operation period; determining whether the target memory block meets a degradation condition when the ERASE verification fails; determining whether the target memory block passes a soft-program verification when the degradation condition is met, and returning to the step of applying the ERASE voltage after the target memory block passes the soft-program verification; returning to the step of applying the ERASE voltage when the target memory block does not meet the degradation condition; and determining whether the target memory block passes the soft-program verification when the ERASE verification passes, and applying a soft-program voltage to the target memory block after the soft-program verification fails.

17 Claims, 5 Drawing Sheets

FLASH MEMORY APPARATUS AND ERASE METHOD THEREOF

CROSS-REFERENCE TO RELATED APPLICATION

This application claims the priority benefit of Taiwan application serial no. 112139755, filed on Oct. 18, 2023. The entirety of the above-mentioned patent application is hereby incorporated by reference herein and made a part of this specification.

BACKGROUND

Technical Field

The disclosure relates to a memory apparatus, and in particular to a flash memory apparatus and an ERASE method thereof for reducing the erasure time required for an ERASE operation.

Description of Related Art

Flash memory apparatus are capable of performing write, erase, and read operations, with the erase operation typically taking the longest time. Therefore, the duration of the ERASE operation can be said to dominate the performance of the flash memory apparatus. Generally, during the ERASE operation of a flash memory apparatus, steps include applying a pre-program voltage, executing an ERASE procedure, and executing a soft-program procedure (also referred to as a post-program procedure). The ERASE procedure includes sequentially applying an ERASE voltage and executing an ERASE verification, applying the ERASE voltage again if the ERASE verification fails, and executing the soft-program procedure if the ERASE verification passes. The soft-program procedure includes executing a soft-program verification, applying a soft-program voltage and returning to the soft-program verification again if the soft-program verification fails, and ending the ERASE operation if the soft-program verification passes. Although the soft-program procedure can reduce over-ERASE, it accounts for a large proportion (such as more than half) of the time required for the erase operation. This is especially true after multiple cycling operations are performed on the flash memory device, as the phenomenon of over-erasure becomes more severe. As a result, the time required for the soft-program procedure increases, becoming a bottleneck in reducing the ERASE time.

SUMMARY

The disclosure provides a flash memory apparatus and an ERASE method thereof, which can dynamically adjust the flow of an ERASE operation to improve the overall efficiency of the ERASE operation.

The ERASE method of the flash memory apparatus of the disclosure includes the following steps. An ERASE voltage is applied to a target memory block and whether the target memory block passes an ERASE verification is determined during an ERASE operation period. Whether the target memory block meets a degradation condition is determined when the target memory block fails the ERASE verification. Whether the target memory block passes a soft-program verification is determined when the target memory block meets the degradation condition, and the step of applying the ERASE voltage to the target memory block is returned to after the target memory block passes the soft-program verification. The step of applying the ERASE voltage to the target memory block is returned to when the target memory block does not meet the degradation condition. Whether the target memory block passes the soft-program verification is determined when the target memory block passes the ERASE verification, and a soft-program voltage is applied to the target memory block after the target memory block fails the soft-program verification. The ERASE operation ends when the target memory block passes the ERASE verification and the soft-program verification.

The flash memory apparatus of the disclosure includes a memory array and a memory control circuit. The memory array includes multiple memory blocks. The memory control circuit is coupled to the memory array and includes an ERASE verification circuit, a degradation determination circuit, and a soft-program verification circuit. The ERASE verification circuit is configured to determine whether a target memory block passes an ERASE verification after applying an ERASE voltage to the target memory block during an ERASE operation period. The degradation determination circuit is coupled to the ERASE verification circuit. The degradation determination circuit includes a comparator, which is configured to determine whether the target memory block meets a degradation condition when the target memory block fails the ERASE verification. The soft-program verification circuit is coupled to the ERASE verification circuit and the degradation determination circuit. The soft-program verification circuit is configured to: determine whether the target memory block passes a soft-program verification when the target memory block meets the degradation condition; and determine whether the target memory block passes the soft-program verification when the target memory block passes the ERASE verification. The memory control circuit is further configured to: apply the ERASE voltage to the target memory block again after the target memory block meets the degradation condition and passes the soft-program verification; apply the ERASE voltage to the target memory block again when the target memory block does not meet the degradation condition; apply a soft-program voltage to the target memory block when the target memory block passes the ERASE verification and fails the soft-program verification; and end the ERASE operation when the target memory block passes the ERASE verification and the soft-program verification.

Based on the above, the flash memory apparatus and an ERASE method thereof of the disclosure can dynamically adjust the flow of the ERASE operation based on whether the target memory block meets the degradation condition. In this way, even after executing multiple cycling operations, the increase in erasure time is kept minimal, thereby improving the ERASE efficiency.

In order for the features and advantages of the disclosure to be more comprehensible, the following specific embodiments are described in detail in conjunction with the drawings.

DESCRIPTION OF THE EMBODIMENTS

Figure 1:
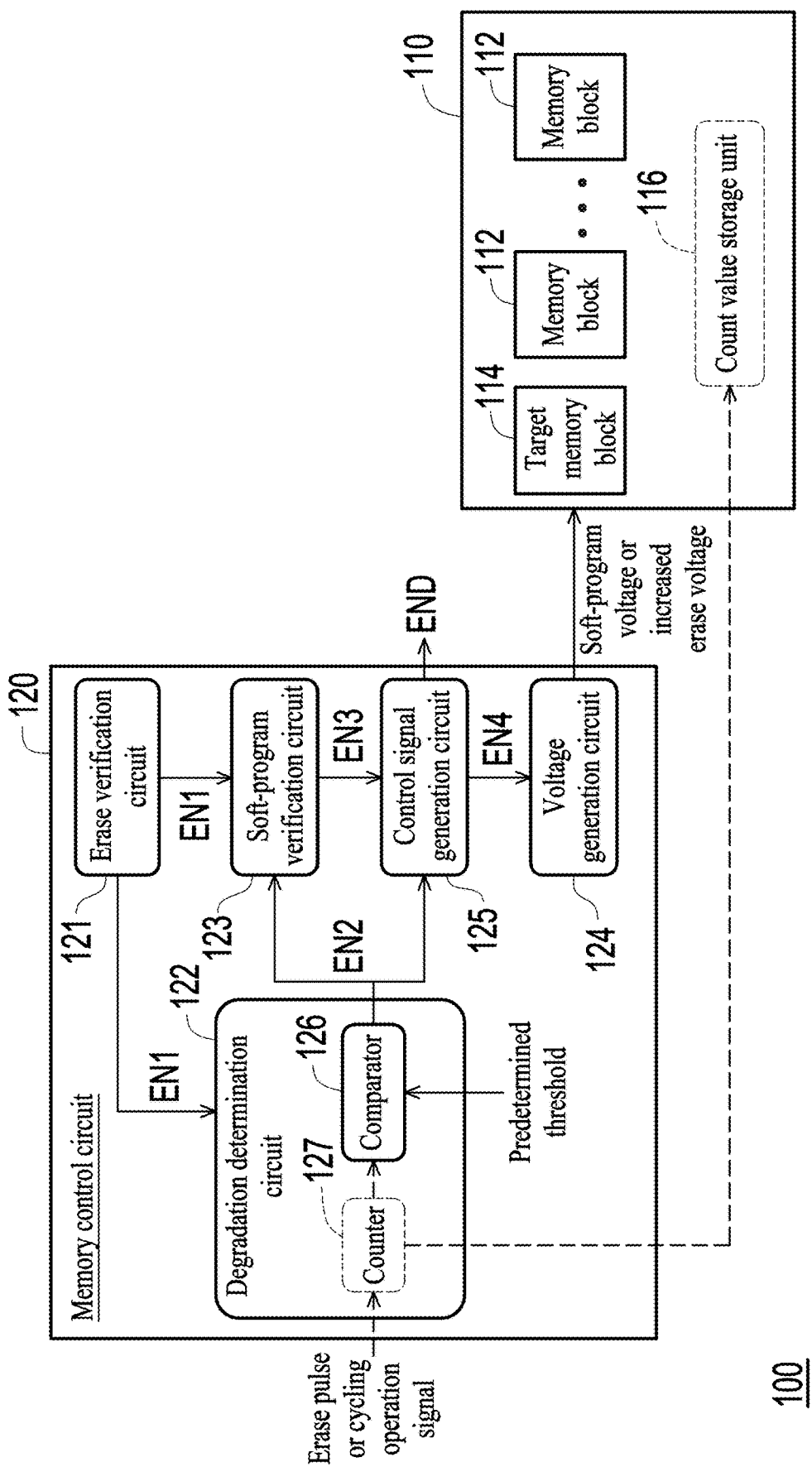
FIG. 1 is a schematic diagram of a flash memory apparatus according to an embodiment of the disclosure.

Please refer to FIG. 1. A flash memory apparatus 100 of an embodiment of the disclosure includes a memory array 110 and a memory control circuit 120. The memory array 110 includes multiple memory blocks 112. Each memory block 112 includes multiple memory cells. In the embodiment of the disclosure, the numbers of the memory blocks 112 and the memory cells are not limited.

The memory control circuit 120 is coupled to the memory array 110. The memory control circuit 120 may be configured to select a target memory block 114 from the memory blocks 112 in the memory array 110 according to a command to execute a specified operation (for example, an erase operation or a program operation). Although the memory control circuit 120 is shown in FIG. 1 as being located in the flash memory apparatus 100, the memory control circuit 120 may also be an apparatus independent of the flash memory apparatus 100.

As shown in FIG. 1, the memory control circuit 120 includes an ERASE verification circuit 121, a degradation determination circuit 122, a soft-program verification circuit 123, a voltage generation circuit 124, and a control signal generation circuit 125. The ERASE verification circuit 121 may be configured to determine whether the target memory block 114 passes an ERASE verification and provide a first signal EN1 after applying an ERASE voltage to the target memory block 114 during an ERASE operation period. When the first signal EN1 is at a first logic level, it indicates that the ERASE verification passes. When the first signal EN1 is at a second logic level, it indicates that the ERASE verification fails.

The degradation determination circuit 122 is coupled to the ERASE verification circuit 121 and receives the first signal EN1. The degradation determination circuit 122 includes a comparator 126. The degradation determination circuit 122 may be configured to determine whether the target memory block 114 meets a degradation condition when the target memory block 114 fails the ERASE verification. In some embodiments, the degradation determination circuit 122 further includes a counter 127 coupled to the comparator 126. The counter 127 may be configured to receive an ERASE pulse during the ERASE operation period, and count an accumulated number of ERASE pulses according to the ERASE pulse. The comparator 126 may be configured to receive the accumulated number of ERASE pulses to be compared with a predetermined threshold. When the accumulated number of ERASE pulses is greater than the predetermined threshold, the degradation determination circuit 122 determines that the target memory block 114 meets the degradation condition.

In another embodiment, the counter 127 may also be configured to receive a cycling operation signal during the ERASE operation period, and count the number of executions of a cycling operation according to the cycling operation signal. The comparator 126 may be configured to receive the number of executions of the cycling operation to be compared with a predetermined threshold. When the number of executions of the cycling operation is greater than the predetermined threshold, the degradation determination circuit 122 determines that the target memory block 114 meets the degradation condition.

In other embodiments, the comparator 126 may also be configured to receive the ERASE voltage to be compared with a predetermined threshold. When the ERASE voltage is greater than the predetermined threshold, the degradation determination circuit 122 determines that the target memory block 114 meets the degradation condition.

The comparator 126 of the degradation determination circuit 122 may provide a second signal EN2. When the second signal EN2 is at the first logic level, it indicates that the target memory block 114 is degraded (meets the degradation condition). When the second signal EN2 is at the second logic level, it indicates that the target memory block 114 is not degraded (does not meet the degradation condition).

In addition, the memory array 110 may further include a count value storage unit 116. The count value storage unit 116 is coupled to the counter 127 of the degradation determination circuit 122 and may be configured to store the accumulated number of ERASE pulses or the number of executions of the cycling operation.

The soft-program verification circuit 123 is coupled to the ERASE verification circuit 121 and the degradation determination circuit 122 to respectively receive the first signal EN1 and the second signal EN2 from the ERASE verification circuit 121 and the degradation determination circuit 122. The soft-program verification circuit 123 may be configured to determine whether the target memory block 114 passes the soft-program verification when the target memory block 114 meets the degradation condition and determine whether the target memory block 114 passes the soft-program verification when the target memory block 114 passes the ERASE verification.

The soft-program verification circuit 123 may also be configured to determine whether the target memory block 114 passes the soft-program verification again after applying a soft-program voltage to the target memory block 114.

The soft-program verification circuit 123 may provide a third signal EN3. When the third signal EN3 is at the first logic level, it indicates that the soft-program verification passes. When the third signal EN3 is at the second logic level, it indicates that the soft-program verification fails.

The voltage generation circuit 124 may be configured to generate the soft-program voltage or the ERASE voltage.

The control signal generation circuit 125 is coupled to the soft-program verification circuit 123 and the degradation determination circuit 122, and respectively receives the third signal EN3 and the second signal EN2 from the soft-program verification circuit 123 and the degradation determination circuit 122. The control signal generation circuit 125 may be configured to provide a fourth signal EN4 to the voltage generation circuit 124 according to output results (that is, the third signal EN3 and the second signal EN2) of the soft-program verification circuit 123 and the degradation determination circuit 122 to control the voltage generation circuit 124 to generate the soft-program voltage or the ERASE voltage. For example, when the fourth signal EN4 is at the second logic level, the voltage generation circuit 124 is disabled. When the fourth signal EN4 is at a third logic level, the voltage generation circuit 124 generates the soft-program voltage. When the fourth signal EN4 is at a fourth logic level, the voltage generation circuit 124 generates an increased ERASE voltage. In an embodiment, when the number of times the ERASE voltage is applied exceeds a predetermined threshold, the voltage generation circuit 124 may increase the voltage value of the ERASE voltage.

In addition, the control signal generation circuit 125 may also provide an end signal END. When the end signal END is at the first logic level, it indicates the end of the ERASE operation. When the end signal END is at the second logic level, it indicates that the ERASE operation has not ended.

Table 1 below is taken as an example to illustrate the logic levels of the first signal EN1 to the fourth signal EN4 and the end signal END corresponding to the three results of ending the ERASE operation, applying the soft-program voltage, and applying the increased ERASE voltage, where Y is at the first logic level, N is at the second logic level, SPV is at the third logic level, and EV is at the fourth logic level.

TABLE 1

| Signal/Result | EN1 | EN2 | EN3 | EN4 | END |
|---|---|---|---|---|---|
| End ERASE operation | Y | — | Y | N | Y |
| Apply soft-program voltage | Y | — | N | SPV | N |
|  | Y | Y | N | SPV | N |
| Apply increased ERASE voltage | N | N | — | EV | N |
|  | N | Y | Y | EV | N |

Figure 2:
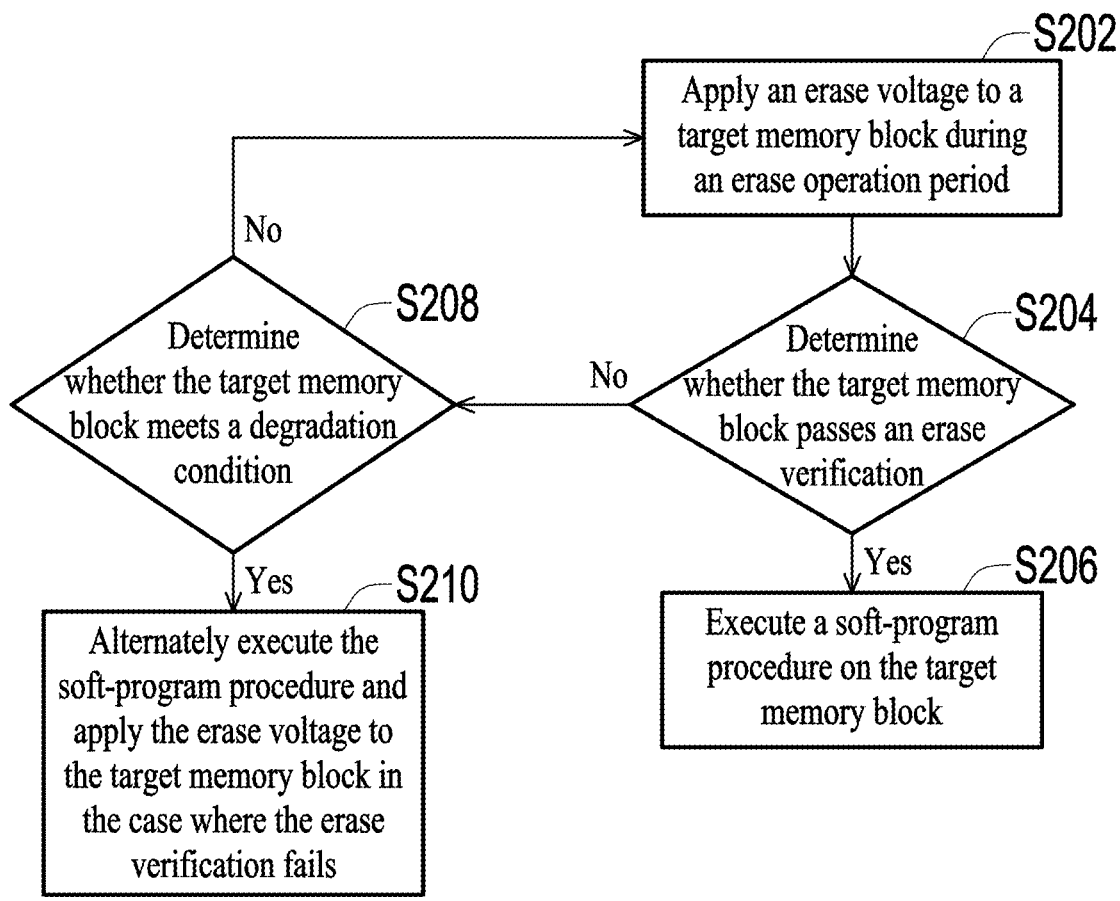
FIG. 2 is a step flowchart of an ERASE method of a flash memory apparatus according to an embodiment of the disclosure.

Please refer to FIG. 1 and FIG. 2 at the same time. An ERASE method of a flash memory apparatus of the embodiment is applicable to the flash memory apparatus 100 of FIG. 1. Each step of the ERASE method of the embodiment of the disclosure is explained below in conjunction with various elements in the flash memory apparatus 100.

First, in Step S202, the memory control circuit 120 applies the ERASE voltage to the target memory block 114 during the ERASE operation period. Specifically, when the memory control circuit 120 receives an ERASE command, the ERASE voltage may be applied to all memory cells in the target memory block 114 to reduce a threshold voltage Vt of the memory cells.

Next, in Step S204, the memory control circuit 120 determines whether the target memory block 114 passes the ERASE verification. Specifically, the memory control circuit 120 may determine whether the threshold voltages Vt of all memory cells in the target memory block 114 are less than an ERASE verification voltage EV. If yes, the memory control circuit 120 determines that the target memory block 114 passes the ERASE verification. If not, the memory control circuit 120 determines that the target memory block 114 fails the ERASE verification.

When the target memory block 114 passes the ERASE verification, in Step S206, the memory control circuit 120 executes a soft-program procedure on the target memory block 114. The soft-program procedure may include the following steps. The soft-program verification is performed on the target memory block 114. When it is determined that the soft-program verification has passed, the ERASE operation ends. When it is determined that the soft-program verification has failed, the soft-program voltage is applied to the target memory block 114 and the soft-program verification is performed again.

When the target memory block 114 fails the ERASE verification, in Step S208, the memory control circuit 120 determines whether the target memory block 114 meets the degradation condition. When the target memory block 114 does not meet the degradation condition, the memory control circuit 120 increases the ERASE voltage and returns to Step S202. By increasing the ERASE voltage only after determining that the target memory block 114 does not meet the degradation condition, the ERASE efficiency can be improved. In other words, when determining that the target memory block 114 fails the ERASE verification and does not meet the degradation condition, the memory control circuit 120 does not execute the soft-program procedure on the target memory block 114, but increases the ERASE voltage and return to Step S202.

In the embodiment, the so-called degradation condition is a condition that may determine whether the target memory block 114 is degraded, such as degradation caused by increased time required for the ERASE operation due to multiple cycling operations. The cycling operation is, for example, a combination of a program operation and an ERASE operation. In an embodiment, the degradation condition may be selected from at least one of the accumulated number of ERASE pulses during a period of the ERASE operation being greater than the predetermined threshold (for example, 20 times), the ERASE voltage being greater than the predetermined threshold, and the number of executions of the cycling operation being greater than the predetermined threshold (for example, 20 times), but the disclosure is not limited thereto. In an embodiment, a counter configured to calculate the accumulated number of applications of the ERASE voltage and/or a counter configured to calculate the number of executions of the cycling operation may be disposed in the flash memory apparatus 100, and the accumulated number of applications of the ERASE voltage or the number of executions of the cycling operation may be stored in a non-volatile memory cell. For example, the accumulated number of applications of the ERASE voltage or the number of executions of the cycling operation are stored in some memory cells of the memory array 110.

In addition, when the target memory block 114 fails the ERASE verification and meets the degradation condition, in Step S210, the memory control circuit 120 alternately executes the soft-program procedure and applies the ERASE voltage to the target memory block 114. Specifically, in the soft-program procedure, the memory control circuit 120 may first determine whether the threshold voltages Vt of all the memory cells in the target memory block 114 are greater than the soft-program verification voltage SPV. If yes, the memory control circuit 120 determines that the target memory block 114 passes the soft-program verification. Then, the memory control circuit 120 applies the ERASE voltage to the target memory block 114 again. In an embodiment, Step S204 may be returned after applying the ERASE voltage to the target memory block 114 again to determine whether the target memory block 114 passes the ERASE verification.

In Step S210, if the threshold voltages Vt of all the memory cells in the target memory block 114 are not all greater than the soft-program verification voltage SPV, the memory control circuit 120 determines that the target memory block 114 fails the soft-program verification. At this time, in the soft-program procedure, the memory control circuit 120 may apply the soft-program voltage to the memory cells in the target memory block 114 to increase the threshold voltages Vt of the memory cells (especially the memory cells with lower threshold voltages Vt), and whether the target memory block 114 passes the soft-program verification is determined again. Moreover, the memory control circuit 120 may repeatedly perform the steps of determining whether the target memory block 114 has passed the soft-program verification and applying the soft-program voltage (referred to herein as the soft-program procedure) on the target memory block 114 if it has not passed the soft-program verification, until the target memory block 114 passes the soft-program verification.

By the above method, the disclosure can dynamically adjust the flow of the ERASE operation according to whether the target memory block 114 meets the degradation condition. That is, compared with the conventional technology that can only execute the soft-program procedure in the case where the ERASE verification passes, in the embodiment, when the target memory block 114 meets the degradation condition, even in the case where the ERASE verification fails, the memory control circuit 120 can still execute the soft-program procedure on the target memory block 114 to increase the threshold voltage Vt of the memory cells. In this way, the embodiment can prevent the case of over-ERASE due to the threshold voltage Vt of the memory cells in the target memory block 114 being reduced too low and can effectively reduce the time spent in the soft-program procedure, thereby reducing the time required for the ERASE operation.

Figure 3:
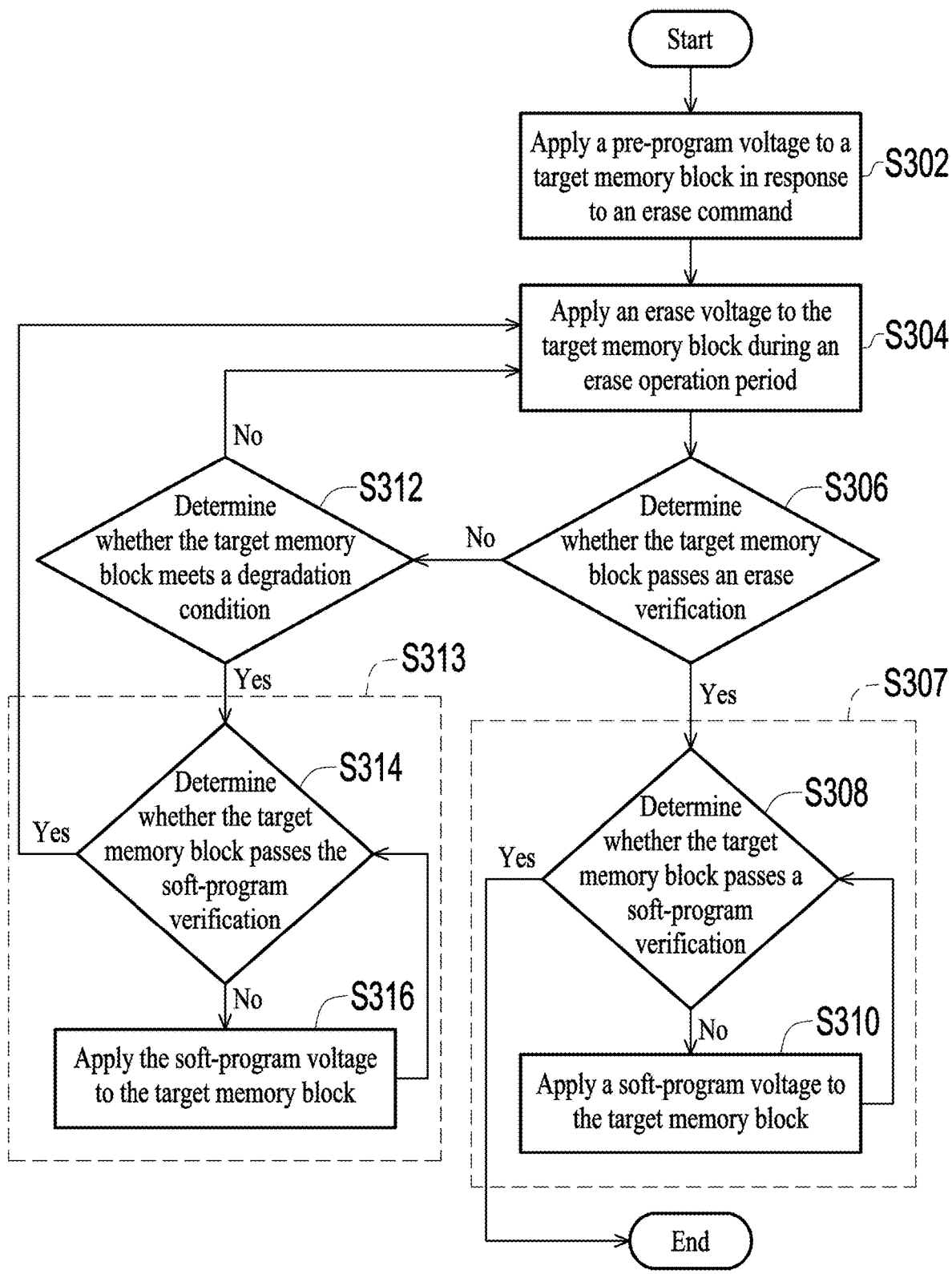
FIG. 3 is a step flowchart of an ERASE method of a flash memory apparatus according to another embodiment of the disclosure.
Figure 4:
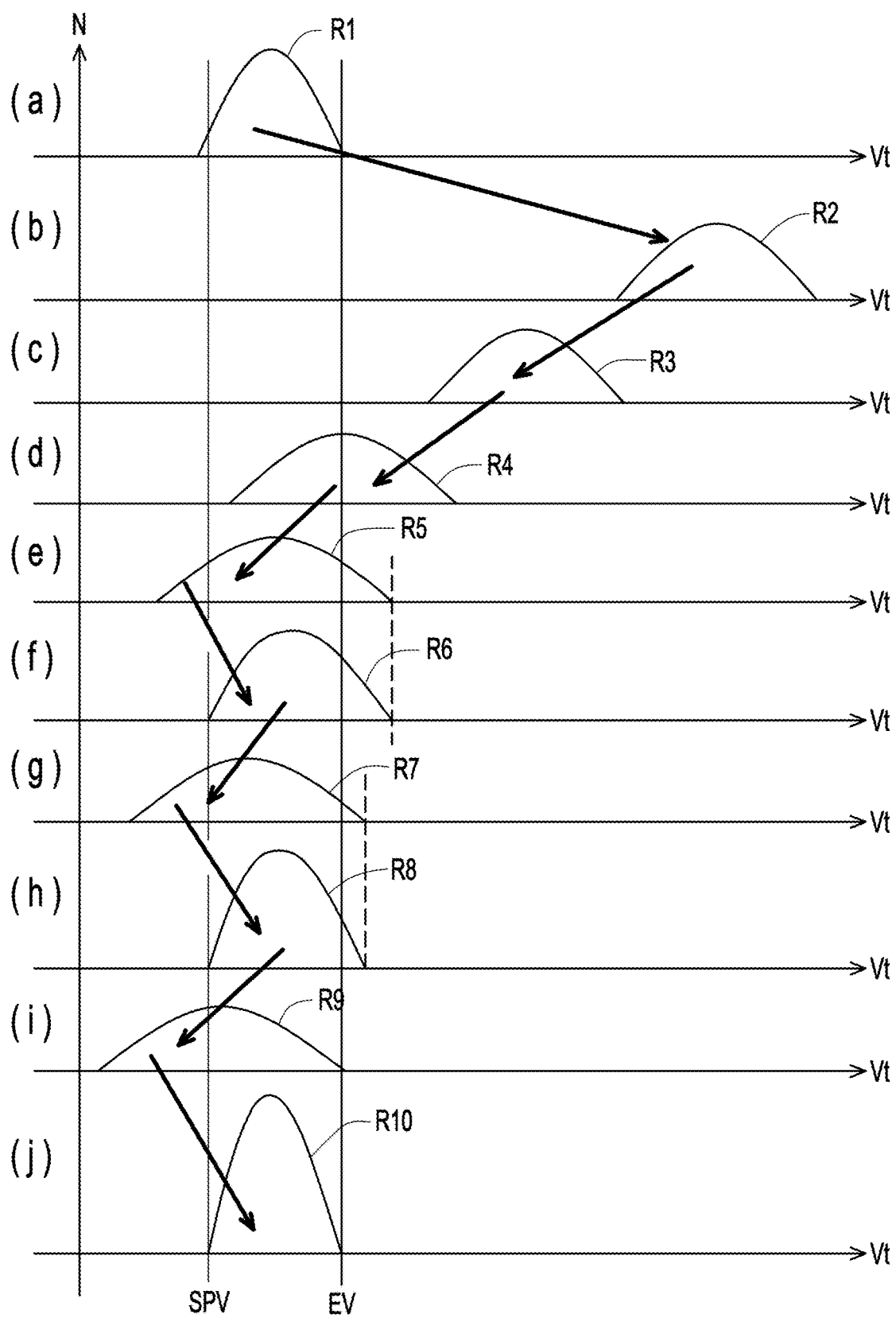
FIG. 4 is a distribution range of a threshold voltage of memory cells in a target memory block at each stage during an ERASE operation period according to an embodiment of the disclosure.

The ERASE method of the disclosure will be described in more detail below with reference to the embodiments shown in FIG. 3 and FIG. 4. In FIG. 4, (a) to (j) respectively represent the distribution range of the threshold voltage Vt of the memory cells in the target memory block 114 at each stage during the ERASE operation period. The horizontal axis is the threshold voltage Vt and the vertical axis is the number of memory cells N. Please refer to FIG. 1, FIG. 3, and FIG. 4 at the same time. The ERASE method of the flash memory apparatus according to another embodiment of the disclosure is applicable to the flash memory apparatus 100 of FIG. 1. Each step of the ERASE method of the embodiment of the disclosure is explained below in conjunction with various elements in the flash memory apparatus 100. In the embodiment, parts the same as or similar to the description of FIG. 2 will not be described again.

First, in Step S302, the memory control circuit 120 may apply a pre-program voltage to the target memory block 114 in response to the ERASE command. Specifically, as shown in (a) of FIG. 4, which exemplifies an initial distribution range R1 of the threshold voltage Vt of the memory cells when the ERASE operation has not started. In the embodiment, the initial distribution range R1 is less than the ERASE verification voltage EV, but the disclosure is not limited thereto. The memory control circuit 120 may apply the pre-program voltage to all the memory cells in the target memory block 114 according to the ERASE command to increase the threshold voltage Vt of the memory cells to a voltage higher than the voltage corresponding to logic "1" or equivalent to the voltage corresponding to logic "0", so as to prevent over-ERASE after subsequent application of the ERASE voltage. As shown in (b) of FIG. 4, which exemplifies the distribution range of the threshold voltage Vt of the memory cells changing from the distribution range R1 to a distribution range R2 after applying the pre-program voltage.

Next, in Step S304, the memory control circuit 120 applies the ERASE voltage to the target memory block 114 during the ERASE operation period. The specific details are as previously described in the content for Step S202 and will not be repeated here.

Next, in Step S306, the memory control circuit 120 determines whether the target memory block 114 passes the ERASE verification. The specific details are as previously described in the content for Step S204 and will not be repeated here. As shown in (c) of FIG. 4, which exemplifies the case of the distribution range of the threshold voltage Vt of the memory cells changing from the distribution range R2 to a distribution range R3 after applying the ERASE voltage. At this time, since the distribution range R3 is not less than the ERASE verification voltage EV, the memory control circuit 120 determines that the target memory block 114 fails the ERASE verification.

When the memory control circuit 120 determines that the target memory block 114 fails the ERASE verification in Step S306, in Step S312, as shown in FIG. 1, the memory control circuit 120 determines whether the target memory block 114 meets the degradation condition. The degradation condition and the determination method thereof are as previously described in the content for Step S208 and will not be described again here.

In Step S312, the memory control circuit 120 returns to Step S304 when the target memory block 114 does not meet the degradation condition. In other words, when the target memory block 114 fails the ERASE verification and does not meet the degradation condition, the memory control circuit 120 does not execute the soft-program procedure on the target memory block 114, but returns to Step S304 to apply the ERASE voltage on the target memory block 114 again, so as to improve the ERASE efficiency. As shown in (d) of FIG. 4, which exemplifies the distribution range of the threshold voltage Vt of the memory cells changing from the distribution range R3 to a distribution range R4 after the memory control circuit 120 applies the ERASE voltage to the target memory block 114 again. Since the distribution range R4 is not less than the ERASE verification voltage EV, the current target memory block 114 still cannot pass the ERASE verification, so Step S312 is executed. The memory control circuit 120 returns to Step S304 when the target memory block 114 does not meet the degradation condition. As shown in (e) of FIG. 4, which exemplifies the distribution range of the threshold voltage Vt of the memory cells changing from the distribution range R4 to a distribution range R5 after the memory control circuit 120 applies the ERASE voltage to the target memory block 114 again. Since the distribution range R5 does not fall below the ERASE verification voltage EV, the current target memory block 114 still cannot pass the ERASE verification, so Step S312 is executed.

When the target memory block 114 meets the degradation condition in Step S312, Step S313 is then executed. In the embodiment, Step S313 includes the soft-program verification (that is, Step S314) and applying the soft-program voltage when the soft-program verification fails (that is, Step S316). In Step S314, the memory control circuit 120 determines whether the target memory block 114 passes the soft-program verification. Specifically, the memory control circuit 120 may determine whether the threshold voltages Vt of all the memory cells in the target memory block 114 are all greater than the soft-program verification voltage SPV. If yes, the memory control circuit 120 determines that the target memory block 114 passes the soft-program verification. If not (as shown in (e) of FIG. 4, a part of the distribution range R5 is less than the soft-program verification voltage SPV), the memory control circuit 120 determines that the target memory block 114 fails the soft-program verification.

When the target memory block 114 meets the degradation condition and fails the soft-program verification, in Step S316, the memory control circuit 120 applies the soft-program voltage to the target memory block 114. Specifically, the memory control circuit 120 may apply the soft-program voltage to the memory cells in the target memory block 114 to increase the threshold voltages Vt of the memory cells (especially the memory cells with lower threshold voltages Vt) (as shown in (f) of FIG. 4). Afterwards, the memory control circuit 120 returns to Step S314 until the target memory block 114 passes the soft-program verification, so as to prevent the case of causing leakage current and affecting a subsequent reading operation. As shown in (f) of FIG. 4, which exemplifies the case of the distribution range of the threshold voltage Vt of the memory cells changing from the distribution range R5 to a distribution range R6 (wherein the highest value of the distribution range remains unchanged and only the lowest value changes) after applying the soft-program voltage to the target memory block 114. At this time, since the distribution range R6 is completely located on the right side of the soft-program verification voltage SPV, the memory control circuit 120 may determine that the target memory block 114 passes the soft-program verification when returning to Step S314.

In Step S314, the memory control circuit 120 returns to Step S304 when the memory control circuit 120 determines that the target memory block 114 passes the soft-program verification.

In an embodiment, before returning to Step S304, the memory control circuit 120 may first increase the intensity of the ERASE voltage, such as increasing the pulse amplitude or the pulse width of the ERASE voltage, so as to apply an ERASE voltage with increased intensity in subsequent Step S304. In an embodiment, before increasing the intensity of the ERASE voltage, the memory control circuit 120 may first determine whether the number of applications of the ERASE voltage is greater than the predetermined threshold. When the number of applications of the ERASE voltage is greater than the predetermined threshold, the memory control circuit 120 increases the intensity of the ERASE voltage, so as to improve the efficiency of the ERASE operation and prevent over-ERASE.

As shown in (g) of FIG. 4, which exemplifies the distribution range of the threshold voltage Vt of the memory cells changing from the distribution range R6 to a distribution range R7 after returning to Step S304. At this time, since the distribution range R7 is not less than the ERASE verification voltage EV, the current target memory block 114 still cannot pass the ERASE verification, so Step S312 is executed. In the example, as mentioned previously, since the result of Step S312 is yes, Step S314 is then executed. In Step S314, since a part of the distribution range R7 is less than the soft-program verification voltage SPV (that is, the soft-program verification fails), Step S316 is then executed. As shown in (h) of FIG. 4, which exemplifies the case of the distribution range of the threshold voltage Vt of the memory cells changing from the distribution range R7 to a distribution range R8 (wherein the highest value of the distribution range remains unchanged and only the lowest value changes) after applying the soft-program voltage to the target memory block 114. At this time, since the distribution range R8 is completely located on the right side of the soft-program verification voltage SPV, the memory control circuit 120 may determine that the target memory block 114 passes the soft-program verification when returning to Step S314. Then, Step S304 is returned to in the example. As shown in (i) of FIG. 4, which exemplifies the distribution range of the threshold voltage Vt of the memory cells changing from the distribution range R8 to a distribution range R9 after returning to Step S304. At this time, since the distribution range R9 is less than the ERASE verification voltage EV (that is, completely falls on the left side of the ERASE verification voltage EV), in Step S306, the memory control circuit 120 may determine that the current target memory block 114 passes the ERASE verification, so Step S307 is executed.

After the target memory block 114 passes the ERASE verification, in Step S307, the memory control circuit 120 executes the soft-program procedure on the target memory block 114. In the embodiment, Step S307 includes the soft-program verification (that is, Step S308) and applying the soft-program voltage when the soft-program verification fails (that is, Step S310). For details about the soft-program verification and the application of the soft-program voltage when the soft-program verification fails, reference may be made to the previously described details and will not be repeated here. However, the difference is that in Step S308, when the target memory block 114 passes the soft-program verification, the memory control circuit 120 ends the entire ERASE operation. That is, when the target memory block 114 passes the ERASE verification and passes the soft-program verification, the ERASE operation ends.

In the example, since the distribution range R9 is less than the ERASE verification voltage EV and a part thereof is less than the soft-program verification voltage SPV, the result of Step S308 is no, and Step S310 is then executed. As shown in (j) of FIG. 4, which exemplifies the case of the distribution range of the threshold voltage Vt of the memory cells changing from the distribution range R9 to a distribution range R10 (wherein the highest value of the distribution range remains unchanged and only the lowest value changes) after applying the soft-program voltage to the target memory block 114. At this time, since the distribution range R10 is completely located on the right side of the soft-program verification voltage SPV, the memory control circuit 120 may determine that the target memory block 114 passes the soft-program verification when returning to Step S314, and then ends the entire ERASE operation.

It should be noted that the changes in the distribution range during the ERASE operation period of FIG. 4 are only an example of the disclosure, and the disclosure is not limited thereto. For example, according to the flash memory apparatus and the ERASE method thereof of the disclosure, in another embodiment that is not explicitly shown, after the N-th application of the ERASE voltage to the target memory block, the distribution range of the threshold voltage Vt of the memory cells may be as shown by the distribution range R5, and then in Step S312, the memory control circuit 120 determines that the target memory block 114 does not meet the degradation condition, and returns to Step S304 to execute the (N+1)-th application of the ERASE voltage to the target memory block, so that the distribution range of the threshold voltage Vt of the memory cells is as shown by the distribution range R9. Then, Step S307 is executed, so that the distribution range of the threshold voltage Vt of the memory cells is between the ERASE verification voltage EV and the soft-program verification voltage SPV as shown by the distribution range R10, and the ERASE operation ends. Persons skilled in the art can obtain relevant modified embodiments from the spirit of the invention and the prior art, so all implementation aspects are not described one by one herein.

Figure 5:
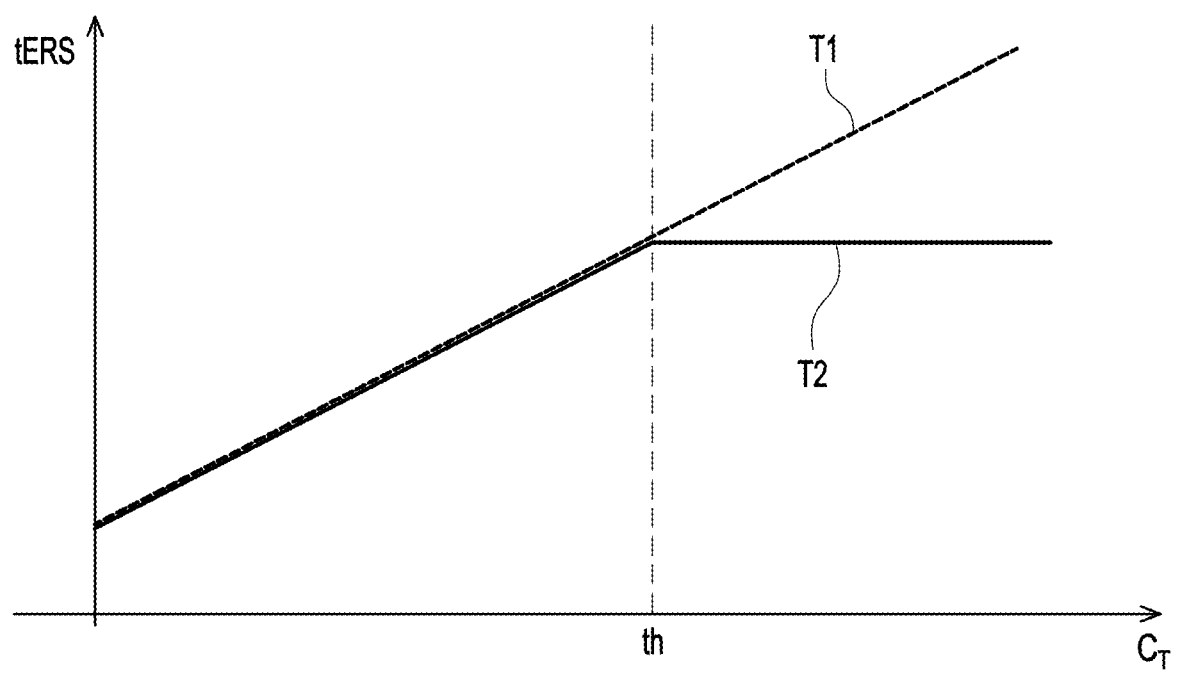
FIG. 5 is a relationship diagram of ERASE time against number of executions of cycling operations according to an embodiment of the disclosure.

The following example illustrates the technical effect of the disclosure in reducing an ERASE time. Please refer to FIG. 5. The horizontal axis of FIG. 5 is the number of executions Cr of the cycling operation and the vertical axis is an ERASE time tERS required for the ERASE operation. A curve T1 represents the relationship between the ERASE time of a traditional flash memory apparatus and the number of executions of the cycling operation. A curve T2 represents the relationship between the ERASE time of the flash memory apparatus of the disclosure and the number of executions of the cycling operation. The traditional flash memory apparatus does not dynamically adjust the flow of the ERASE operation, and does not execute the soft-program procedure on the target memory block in the case of failing the ERASE verification regardless of whether the degradation condition is met. Therefore, it can be clearly seen from FIG. 5 that the curve T1 continues to rise as the number of executions of the cycling operation increases, and even when the number of executions of the cycling operation is greater than a threshold th (such as indicating that the target memory block meets the degradation condition), the rising trend does not slow down. In other words, the ERASE time tERS spent by the traditional flash memory apparatus becomes longer and longer after executing multiple cycling operations, which becomes a bottleneck that is difficult to break through.

On the other hand, the curve T2 almost overlaps with the curve T1 when the number of executions of the cycling operation is below the threshold th. However, when the number of executions of the cycling operation is greater than the threshold th (indicating that the target memory block meets the degradation condition), the flash memory apparatus of the disclosure can dynamically adjust the flow of the ERASE operation to as shown in the example of FIG. 4, and the soft-program procedure is immediately first executed on the target memory block even in the case where the ERASE verification fails. In this way, as shown in FIG. 5, when the number of executions of the cycling operation is greater than the threshold th, the rising trend gradually slows down. In other words, the ERASE time spent by the flash memory apparatus of the disclosure does not indefinitely increase even after executing multiple cycling operations, which can obtain a faster ERASE time.

In summary, the flash memory apparatus and the ERASE method thereof of the disclosure can dynamically adjust the flow of the ERASE operation according to whether the target memory block meets the degradation condition, so as to appropriately alternately execute the soft-program procedure and apply the ERASE voltage, which can ensure that the ERASE time does not rapidly increase even after executing multiple cycling operations to obtain a faster ERASE time. In addition, since the ERASE time is shortened, the disclosure can reduce the energy consumption required for the ERASE operation, and the reliability and durability of the flash memory apparatus and the ERASE method thereof of the disclosure are improved, so the disclosure provides a green semiconductor technology.

Although some embodiments and advantages thereof of the disclosure have been described in detail above, it should be understood that various changes, substitutions, and modifications may be made without departing from the spirit and scope of the disclosure as defined by the claims of the disclosure. For example, persons skilled in the art to which the disclosure pertains can readily understand that many of the described circuits, elements, and functions may be modified without departing from the scope of the disclosure.

What is claimed is:

1. An ERASE method of a flash memory apparatus, comprising:
    applying an ERASE voltage to a target memory block and determining whether the target memory block passes an ERASE verification during an ERASE operation period;
    determining whether the target memory block meets a degradation condition when the target memory block fails the ERASE verification;
    determining whether the target memory block passes a soft-program verification when the target memory block meets the degradation condition, and returning to the step of applying the ERASE voltage to the target memory block after the target memory block passes the soft-program verification;
    returning to the step of applying the ERASE voltage to the target memory block when the target memory block does not meet the degradation condition;
    determining whether the target memory block passes the soft-program verification when the target memory block passes the ERASE verification, and applying a soft-program voltage to the target memory block after the target memory block fails the soft-program verification; and
    ending the ERASE operation when the target memory block passes the ERASE verification and the soft-program verification.

2. The ERASE method of the flash memory apparatus according to claim 1, further comprising returning to the step of determining whether the target memory block passes the soft-program verification after applying the soft-program voltage to the target memory block.

3. The ERASE method of the flash memory apparatus according to claim 1, further comprising:
    applying the soft-program voltage to the target memory block when the target memory block meets the degradation condition and after the target memory block fails the soft-program verification.

4. The ERASE method of the flash memory apparatus according to claim 1, wherein the degradation condition comprises at least one of an accumulated number of ERASE pulses during a period of the ERASE operation being greater than a first threshold, the ERASE voltage being greater than a preset voltage, and a number of executions of a cycling operation being greater than a second threshold.

5. The ERASE method of the flash memory apparatus according to claim 1, further comprising:
    applying a pre-program voltage to the target memory block during the ERASE operation period,
    wherein the step of determining whether the target memory block passes the ERASE verification comprises:
        determining whether threshold voltages of all memory cells in the target memory block are all less than an ERASE verification voltage; and
        determining that the target memory block passes the ERASE verification when yes.

6. The ERASE method of the flash memory apparatus according to claim 1, further comprising:
    determining whether a number of applications of the ERASE voltage is greater than a third threshold before returning to the step of applying the ERASE voltage to the target memory block; and
    increasing a voltage value of the ERASE voltage when the number of applications of the ERASE voltage is greater than the third threshold, and using the increased ERASE voltage when returning to the step of applying the ERASE voltage to the target memory block.

7. A flash memory apparatus, comprising:
    a memory array, comprising a plurality of memory blocks; and
    a memory control circuit, coupled to the memory array, comprising:
        an ERASE verification circuit, configured to determine whether a target memory block passes an ERASE verification after applying an ERASE voltage to the target memory block during an ERASE operation period;

a degradation determination circuit, coupled to the ERASE verification circuit, comprising a comparator, and configured to determine whether the target memory block meets a degradation condition when the target memory block fails the ERASE verification; and a soft-program verification circuit, coupled to the ERASE verification circuit and the degradation determination circuit, and configured to:

determine whether the target memory block passes a soft-program verification when the target memory block meets the degradation condition; and determine whether the target memory block passes the soft-program verification when the target memory block passes the ERASE verification;

the memory control circuit is also configured to:

apply the ERASE voltage to the target memory block again after the target memory block meets the degradation condition and passes the soft-program verification;

apply the ERASE voltage to the target memory block again when the target memory block does not meet the degradation condition;

apply a soft-program voltage to the target memory block when the target memory block passes the ERASE verification and fails the soft-program verification; and end the ERASE operation when the target memory block passes the ERASE verification and the soft-program verification.

8. The flash memory apparatus according to claim 7, wherein the degradation determination circuit further comprises a counter coupled to the comparator, the counter is configured to receive an ERASE pulse during the ERASE operation period, and count an accumulated number of ERASE pulses according to the ERASE pulse, wherein the comparator is configured to receive the accumulated number of ERASE pulses to be compared with a predetermined threshold, and the degradation determination circuit determines that the target memory block meets the degradation condition when the accumulated number of ERASE pulses is greater than the predetermined threshold.

9. The flash memory apparatus according to claim 8, wherein the memory array further comprises a count value storage unit configured to store the accumulated number of ERASE pulses or a number of executions of the cycling operation.

10. The flash memory apparatus according to claim 7, wherein the degradation determination circuit further comprises a counter coupled to the comparator, the counter is configured to receive a cycling operation signal during the ERASE operation period, and count a number of executions of a cycling operation according to the cycling operation signal, wherein the comparator is configured to receive the number of executions of the cycling operation to be compared with a predetermined threshold, and the degradation determination circuit determines that the target memory block meets the degradation condition when the number of executions of the cycling operation is greater than the predetermined threshold.

11. The flash memory apparatus according to claim 9, wherein the memory array further comprises a count value storage unit configured to store an accumulated number of ERASE pulses or the number of executions of the cycling operation.

12. The flash memory apparatus according to claim 7, wherein the soft-program verification circuit is also configured to:

determine whether the target memory block passes the soft-program verification again after applying the soft-program voltage to the target memory block.

13. The flash memory apparatus according to claim 12, further comprising:

a voltage generation circuit, configured to generate the soft-program voltage or the ERASE voltage; and a control signal generation circuit, coupled to the soft-program verification circuit and the degradation determination circuit, and configured to control the voltage generation circuit to generate the soft-program voltage or the ERASE voltage according to output results of the soft-program verification circuit and the degradation determination circuit.

14. The flash memory apparatus according to claim 13, wherein the memory control circuit is also configured to determine whether a number of applications of the ERASE voltage is greater than a predetermined threshold before applying the ERASE voltage to the target memory block again, and the voltage generation circuit increases a voltage value of the ERASE voltage when the number of applications of the ERASE voltage is greater than the predetermined threshold.

15. The flash memory apparatus according to claim 7, wherein the memory control circuit is also configured to apply the soft-program voltage to the target memory block when the target memory block meets the degradation condition and after the target memory block fails the soft-program verification.

16. The flash memory apparatus according to claim 7, wherein the comparator is configured to receive the ERASE voltage to be compared with a predetermined threshold, and the degradation determination circuit determines that the target memory block meets the degradation condition when the ERASE voltage is greater than the predetermined threshold.

17. The flash memory apparatus according to claim 7, wherein the memory control circuit is also configured to:

apply a pre-program voltage to the target memory block during the ERASE operation period, wherein the ERASE verification circuit is configured to determine whether threshold voltages of all memory cells in the target memory block are all less than an ERASE verification voltage, and determine that the target memory block passes the ERASE verification when yes.

* * * * *